(12) United States Patent
Jain

(10) Patent No.: US 8,591,627 B2
(45) Date of Patent: Nov. 26, 2013

(54) CARBON DIOXIDE RECOVERY

(75) Inventor: Ravi Jain, Bridgewater, NJ (US)

(73) Assignee: Innosepra LLC, Bridgewater, NJ (US)

( * ) Notice: Subject to any disclaimer, the term of this patent is extended or adjusted under 35 U.S.C. 154(b) by 609 days.

(21) Appl. No.: 12/419,513

(22) Filed: Apr. 7, 2009

(65) Prior Publication Data

US 2010/0251887 A1 Oct. 7, 2010

(51) Int. Cl.
*B01D 53/22* (2006.01)

(52) U.S. Cl.
USPC .......... 95/52; 95/96; 95/114; 95/117; 95/139; 95/148; 96/130

(58) Field of Classification Search
USPC .............. 95/52, 96, 114, 117, 121, 116, 126, 95/139, 148; 96/130
See application file for complete search history.

(56) References Cited

U.S. PATENT DOCUMENTS

| | | | |
|---|---|---|---|
| 4,711,645 A | 12/1987 | Kumar | |
| 5,240,472 A * | 8/1993 | Sircar | 95/52 |
| 5,846,295 A | 12/1998 | Kalbassi et al. | |
| 6,530,975 B2 * | 3/2003 | Rode et al. | 95/117 |
| 2007/0028772 A1 * | 2/2007 | Jain et al. | 95/135 |

FOREIGN PATENT DOCUMENTS

| | | |
|---|---|---|
| EP | 0862937 A2 | 9/1998 |
| EP | 1226860 A1 | 7/2002 |
| WO | WO2007019490 A2 | 2/2007 |

* cited by examiner

*Primary Examiner* — Robert A Hopkins
(74) *Attorney, Agent, or Firm* — Ashok Tankha

(57) ABSTRACT

Disclosed herein is a method and system for separating carbon dioxide ($CO_2$) from a CO2 containing gas stream containing water vapor and additional impurities, for example, nitrogen, oxygen, sulfur oxides, nitrogen oxides, and mercury. The CO2 is captured by subjecting the $CO_2$ gas feed stream to a temperature swing adsorption step. The temperature swing adsorption step comprises an adsorption step for producing a substantially dry carbon dioxide-depleted stream, and an adsorbent regeneration step comprising heating the adsorbent bed to produce a substantially water vapor-free carbon dioxide stream. Moisture from the gas stream containing $CO_2$ is optionally removed by pressure swing adsorption, temperature swing adsorption, membrane separation, or absorption prior to $CO_2$ capture.

24 Claims, 7 Drawing Sheets

CARBON DIOXIDE RECOVERY

CROSS REFERENCE TO RELATED APPLICATIONS

This application claims the benefit of provisional patent application No. 61/123,259 titled "Process For Carbon Dioxide Recovery", filed on Apr. 7, 2008 in the United States Patent and Trademark Office.

BACKGROUND

The method and system disclosed herein relates to capturing carbon dioxide ($CO_2$) from combustion sources such as flue gas of a power plant and making the $CO_2$ available for sequestration or other uses.

Emissions of greenhouse gases such as $CO_2$, if left unchecked, may potentially affect climatic conditions. Conversion of fossil fuels such as coal and natural gas to energy is a source of greenhouse gas emissions. Emissions of the greenhouse gases can be reduced by various means such as increase in efficiency of the combustion process and use of renewable energy such as wind and solar but the reduction in the emission of the greenhouse gases required to stabilize the greenhouse gas levels cannot be achieved without capturing a substantial part of the greenhouse gases at the source of the greenhouse gas emissions during either the pre-combustion process or the post-combustion process. Post-combustion capture of $CO_2$ from the flue gas of a power plant or other streams such as the flue gas from a refinery involves use of a solvent, typically an amine, which is regenerated using a part of the steam generated during the combustion process. Pre-combustion capture of $CO_2$ involves chemical reaction of the fuel with air or oxygen and then with steam to produce a mixture of carbon dioxide and hydrogen. The carbon dioxide is removed from this stream through a $CO_2$ capture process and hydrogen may be used as a fuel for power generation. If oxygen is used for combustion, a flue gas containing mainly carbon dioxide is produced which can be easily separated for sequestration.

The post-combustion capture of $CO_2$ results in 9%-11% reduction in absolute efficiency for power generation and about 28-30% reduction in relative efficiency for a pulverized coal power plant as discussed by Ciferno (Ciferno, J., "A Feasibility Study of Carbon Dioxide Capture from an Existing Coal-Fired Power Plant," paper presented at the Sixth Annual Conference on Carbon Capture and Sequestration, Pittsburgh, Pa., May 2007.). A May 2007 NETL report (Carbon Sequestration Technology Roadmap and Program Plan—2007, U.S. DOE National Energy Technology Laboratory (NETL), May 2007.) shows a 60-100% increase in cost of power generation for existing power plants taking into account capital and operating costs for $CO_2$ separation and sequestration. Net power output from the power plant is also decreased by 30% or more. Means to significantly decrease the power and capital penalty associated with the post-combustion $CO_2$ capture are sought. For the post-combustion capture, the Department Of Energy (DOE) has a goal of less than 35% increase in power cost for 90% $CO_2$ capture.

Most studies dealing with the post-combustion $CO_2$ capture use amine or ammonia-based absorption processes for the removal of carbon dioxide from the flue gas. The absorption-based processes have drawbacks such as the significant capital requirements. The best amine based absorbents such as the hindered amines and amine blends have an energy requirement in the range of 750-900 Kcal/kg (1,350-1,620 Btu/lb) of the $CO_2$ captured. Furthermore, amine-based processes require the use of specialty steel equipment and the associated capital investment because of the corrosive nature of amine and ammonia solutions in the presence of acidic gases and oxygen. This equipment represents a significant capital cost.

In contrast to the amine-based systems, the heats of adsorption of $CO_2$ on various zeolite and carbon based adsorbents range between 140-240 kcal/kg or 252-432 Btu/lb (Valenzuela, D. P. and A. L Myers, "Adsorption Equilibrium Data Handbook," Prentice Hall, Englewood Cliffs, N.J., 1989.) which is about a fifth of the heat of absorption for the amine-based systems. There is an unmet need for practical adsorption systems that can take advantage of low heats of adsorption while providing high carbon dioxide yield and high recovery.

Temperature swing adsorption systems have been used extensively for applications such as air drying, natural gas drying, and water and $CO_2$ removal prior to cryogenic distillation of air. These systems typically remove less than 2% of impurities and the regeneration outlet stream containing the impurities is not of high purity. Also the typical temperature swing adsorption processes have adsorption times of the order of 4-12 hours. For feed $CO_2$ concentrations between 10-12% in the flue gas, these adsorption times would require extremely large adsorption beds. For example, assuming a working capacity of 12 weight % (difference in capacity between the adsorption and the regeneration steps), an adsorbent density of about 660 kgs/m$^3$ and an adsorption time of 4 hours, a plant processing 1000 tons/day of $CO_2$ in the feed would require about 8,000 m$^3$ (5.3 million kilograms) of the adsorbent, a size that makes the systems not practical for capturing carbon dioxide from combustion sources.

The method and system disclosed herein provides a solution for the efficient capture of $CO_2$ using a process based on a temperature and pressure swing adsorption cycles.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The method and system disclosed herein addresses the above stated need for separating carbon dioxide ($CO_2$) from a gas stream containing water vapor and additional impurities. The method and system disclosed herein captures $CO_2$ using a process based on a temperature and pressure swing adsorption cycles. The gas is a flue gas from a coal-fired power plant, a natural gas fired power plant, or a refinery.

High purity $CO_2$, i.e., $CO_2$ containing no more than about 10 percent by volume of impurities, is produced by subjecting a $CO_2$ gas stream to a temperature swing adsorption step. The temperature swing adsorption step comprises an adsorption step for producing a substantially dry $CO_2$-depleted stream, and an adsorbent regeneration step comprising heating the adsorbent bed to produce a substantially water vapor-free $CO_2$ stream. Temperature in the temperature swing adsorption step during the adsorbent regeneration step is increased to about 80° C. to 300° C. Duration of the temperature swing adsorption step is in a range of about 2 minutes to 60 minutes.

The adsorption is generally carried out in the gaseous phase at temperatures between 10° C. and 80° C. and at pressures in the range of about 1.07 to 40.0 bar absolute. The $CO_2$ concentration is in a range of about 3% to 60% by volume.

The impurities that are preferably removed from the $CO_2$ containing gas stream are selected from the group comprising, for example, nitrogen, oxygen, hydrocarbons, nitrogen oxides, sulfur oxides, mercury, and argon. The adsorption is conducted in a bed comprising an adsorbent material, which preferentially adsorbs or reacts with $CO_2$ in the gas stream.

In an embodiment, the impurities comprising, for example, moisture, hydrocarbons, nitrogen oxides, sulfur oxides, and mercury are removed prior to $CO_2$ adsorption. The moisture removal is performed using, for example, pressure swing adsorption, temperature swing adsorption, membrane separation, and absorption. Duration of the pressure swing adsorption process is in a range of about 4 minutes to about 60 minutes and duration of the temperature swing adsorption process is in a range of about 1 hour to 12.0 hours. The moisture content in the moisture removal step is reduced to a dew point of −40° C. or below. Adsorbents, for example, activated carbon, carbon molecular sieves, zeolites such as 4A, 5A, 13X, NaY and CaX, metallorganic framework compounds, natural zeolites, modified natural and synthetic zeolites, modified activated carbon, pillared clays, etc. are used for $CO_2$ adsorption. The $CO_2$-depleted stream from the $CO_2$ adsorption section is used for the regeneration of the moisture adsorption system.

In another embodiment, the feed containing moisture is sent directly to the $CO_2$ adsorption system wherein $CO_2$ from the feed is removed by activated carbon or by chemical reaction with sodium and potassium carbonates, amines or ionic liquids supported on a microporous support.

In both embodiments, the material containing $CO_2$ is regenerated by direct or indirect heat transfer to produce a high purity $CO_2$ stream. Further $CO_2$ removal is performed by bed evacuation after heating. The $CO_2$ produced is further purified by a membrane process, a distillation process, an adsorption process, or a getter process to remove impurities comprising, for example, nitrogen, oxygen, argon, nitrogen oxides, sulfur oxides, and moisture. Part of the purified $CO_2$ can be used as a rinse in the $CO_2$ separation system. The method and system disclosed is effective for the removal of about 80% or higher amounts by volume of impurities from the $CO_2$ stream.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
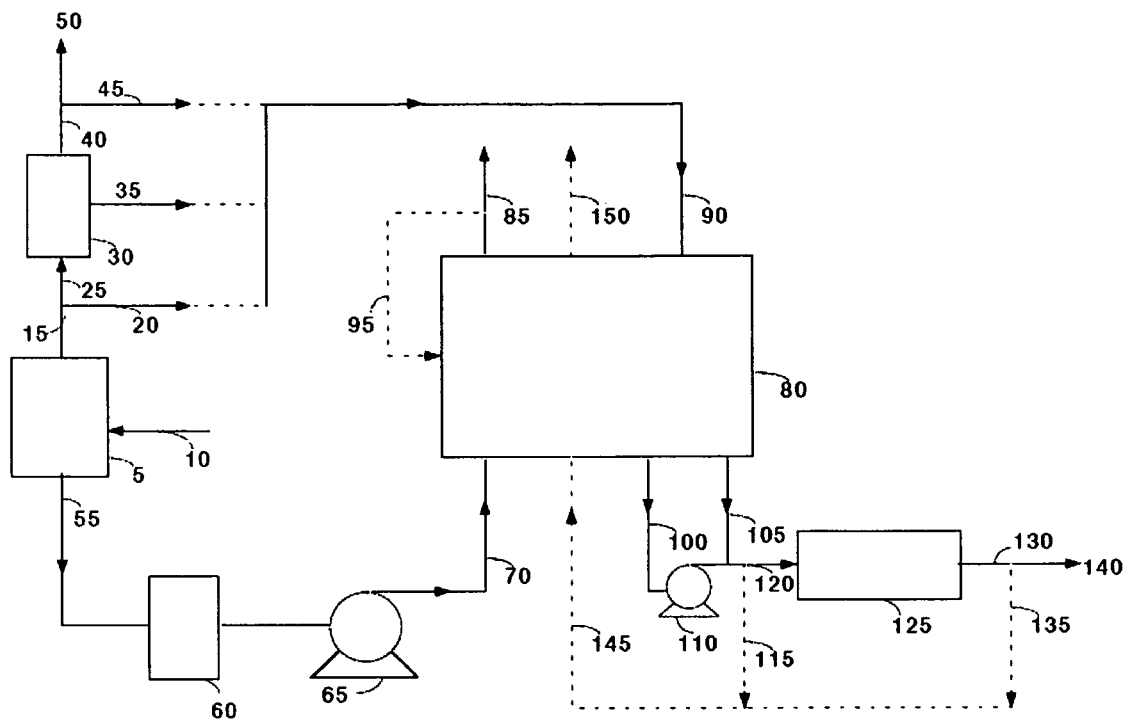
FIG. 1 illustrates an overall schematic of the carbon dioxide ($CO_2$) separation system for recovering high purity $CO_2$ from a feed stream containing $CO_2$.

FIG. 1 illustrates an overall schematic of the carbon dioxide ($CO_2$) separation system 80 for recovering high purity $CO_2$ from a feed stream containing $CO_2$. The $CO_2$ is generated in a process 5 which could be a combustion process or another process that generates $CO_2$. If process 5 is a combustion process, an oxygen-enriched stream 10 can be optionally used during the combustion to improve combustion efficiency and to increase the concentration of $CO_2$ resulting from combustion. Using the heat-generated in process 5, steam can be generated as stream 15. A part of stream 15 can be taken as stream 20 and used in the $CO_2$ separation system 80 described later. The remaining part of stream 15 is taken off as stream 25 and can be used for other purposes, for example, for power generation or for the production of synthesis gas in unit 30. Stream 35, the low pressure stream or hot water in unit 30, can be used in the $CO_2$ separation system 80 or can be sent to unit 5 for generating steam. A portion of electrical power generated in unit 30 can be sent to the $CO_2$ separation system 80 via line 45. The remaining electrical power can be supplied to the end users such as the industrial and the residential customers through line 50. The $CO_2$ containing stream such as the flue gas leaves process 5 as stream 55.

After removing particulates, the stream 55 can be optionally sent to a feed conditioning unit 60 to remove impurities such as the oxides of nitrogen and sulfur, and mercury. The pressure of stream 55 containing residual sulfur and nitrogen oxides, mercury, nitrogen, oxygen and argon as the main impurities can be raised, if needed, by a fan or a blower 65 after unit 60. If the $CO_2$ containing stream is from a chemical plant or a refinery or from a pre-combustion process, the $CO_2$ containing stream may contain additional impurities, for example, hydrogen, hydrocarbons, and carbon monoxide. For a coal or a natural gas fired power plant, the pressure of the flue gas will typically be raised to about between 1.07 bara to 1.34 bara. For the $CO_2$ stream generated in chemical or industrial processes, the pressure of the stream may be higher than 1.07-1.34 bara and may not have to be raised. In a gasification process where the fuel is gasified with air or oxygen, the pressure of the stream containing $CO_2$ may be several atmospheres and would not have to be raised. In the oxy-combustion process the flue gas may be recycled to the combustion system to increase the concentration of $CO_2$. After the removal of nitrogen oxides, sulfur oxides and mercury, and compression, the $CO_2$-containing stream is typically cooled to between near ambient temperature and 60° C. prior to $CO_2$ capture. The flue gas cooling unit is not shown in FIG. 1. Many power plants have systems for the removal of particulates, nitrogen oxides, and sulfur oxides. The systems may include selective catalytic reduction (SCR) for nitrogen oxides, electrostatic precipitators for the particulates, and wet scrubbers for sulfur oxides. Removal of particulates, nitrogen oxides, and sulfur oxides may not be necessary if stream 55 comes from a process such as partial oxidation or reforming.

The stream containing $CO_2$ leaves unit 65 as stream 70 and enters the $CO_2$ separation system 80. The $CO_2$ separation system 80 contains at least one bed with a material that removes $CO_2$ from the feed stream by adsorption or chemical reaction. The pressure of the bed ranges from about 1.07 bar absolute to about 40 bar absolute. Depending on the material used for $CO_2$ capture, the $CO_2$ separation system 80 may contain additional units for the removal of other components in the feed stream such as moisture, residual sulfur oxides, nitrogen oxides, and mercury. If a material such as activated carbon, or potassium carbonate, an amine or an ionic liquid on a microporous support is used for $CO_2$ removal, the moisture in the feed stream 70 may not have to be removed and the $CO_2$-depleted stream 85 exiting the $CO_2$ separation system 80 would contain most of the moisture contained in stream 70. In this case, stream 85 can be vented. However, if a material such as a zeolite is used for $CO_2$ capture by adsorption, the moisture from the feed stream 70 would have to be removed prior to $CO_2$ adsorption and the $CO_2$-depleted stream 85 would be relatively dry. In this case, a part or all of stream 85, stream 95, can be used for regenerating the moisture adsorption system 79.

The $CO_2$ captured in the $CO_2$ separation system 80 is recovered by desorbing the $CO_2$. The energy for $CO_2$ desorption can be provided by stream 20, stream 35 or electricity represented by stream 45. Other external sources of heat and electricity can also be used for regenerating the material in the $CO_2$ separation system 80. The adsorbent or reactant can be contacted directly by steam or condensate if the material is able to handle it. The material in the $CO_2$ separation system 80 can also be regenerated by dry $CO_2$ depleted stream 85 which is heated with steam, hot water or electricity. If the adsorbent material is not water tolerant, the adsorbent bed would have to be heated indirectly by steam or hot water. Typically, the regeneration of the moisture adsorption material and the $CO_2$ adsorption material in the $CO_2$ separation system 80 would be done in parallel to ensure that the $CO_2$ leaving the $CO_2$ separation system 80 is dry. In addition to heat, a vacuum pump may be used to remove $CO_2$ from the $CO_2$ separation system 80. The stream used for regeneration is depicted as stream 90 in FIG. 1. More than 80% of the impurities are typically removed in the $CO_2$ separation section.

The desorbed $CO_2$ exits the $CO_2$ separation system 80 via line 105 and is sent to a $CO_2$ purification system 125. An optional vacuum pump 110 may be used to facilitate the recovery of $CO_2$ from the $CO_2$ separation system 80. Part of the $CO_2$ product enters the vacuum pump 110 as stream 100 and joins stream 105 after exiting the vacuum pump 110. The stream 105 and the stream exiting the vacuum pump 110 are combined to form the $CO_2$ product stream which enters the $CO_2$ purification system 125 as stream 120. The purity of the $CO_2$ product stream 120 produced during regeneration is dependent on the feed $CO_2$ concentration but would typically be higher than 90%. This stream 120 can be optionally compressed to pressures between 1.1 bara and 200 bara prior to purification. The $CO_2$ purification system 125 can be, for example, a distillation system, a membrane system, a pressure or temperature swing adsorption system or a getter system to remove small amounts of impurities such as nitrogen, oxygen, nitrogen oxides and sulfur oxides from $CO_2$. Also, if the $CO_2$ stream exiting the $CO_2$ separation system 80 is wet, the moisture is also removed. Purified $CO_2$ leaves as stream 130 from the $CO_2$ purification system 125. Stream 135, which is a small part of stream 120, stream 115, or stream 130, may be used to purge the inerts in the $CO_2$ separation system 80. This stream 135 enters the $CO_2$ separation system 80 as stream 145. The purified $CO_2$ product exits the $CO_2$ purification system 125 as stream 140 and is available for food or beverage applications, industrial applications, enhanced oil or gas recovery, and sequestration. The $CO_2$ product stream 140 may have to be compressed, liquefied or both prior to some of these applications.

FIGS. 2A-2D exemplarily illustrate various configurations of the $CO_2$ separation system 80 wherein moisture is optionally removed in a first separation unit followed by the capture of $CO_2$ by chemical reaction or adsorption in a second separation unit.

Figure 2A:
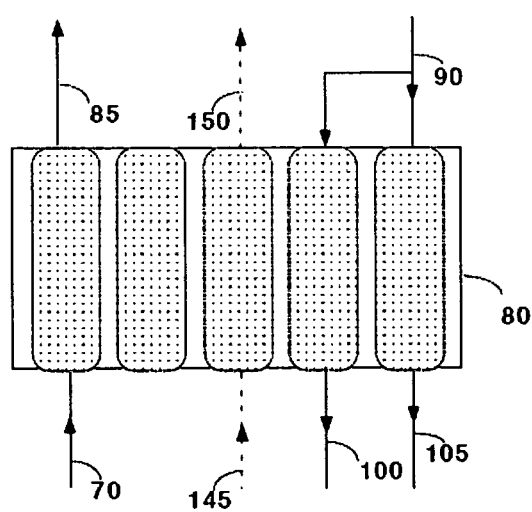
FIGS. 2A-2D exemplarily illustrate various configurations of the $CO_2$ separation system wherein moisture is optionally removed in a first separation unit followed by the capture of $CO_2$ by chemical reaction or adsorption in a second separation unit.

In FIG. 2A, a wet $CO_2$ stream 70 is passed through a bed of material that adsorbs or reacts with $CO_2$ in the presence of moisture. The adsorption or chemical reaction system contains at least two beds at least one of which is removing $CO_2$ from the feed stream while at least one of which is undergoing regeneration at any given time. As disclosed later in relation to FIG. 4, additional beds may be used for other steps such as cooling, pressurization, rinse, and evacuation. The rinse step can be performed using a relatively pure $CO_2$ stream 145. As illustrated in FIG. 1, the $CO_2$ product stream exits the $CO_2$ separation system 80 as stream 105 and as an additional optional stream 100.

Figure 2B:
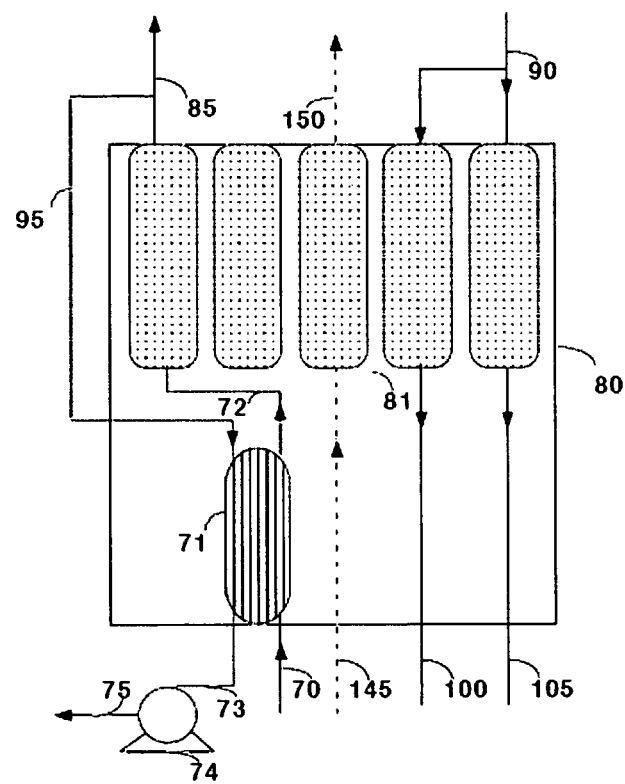

In FIG. 2B, wet $CO_2$ stream 70 is passed through a membrane dryer 71 where the moisture from the feed stream is removed. The dry feed stream 72 is sent to the adsorption or reaction bed 81 wherein the $CO_2$ from the feed is removed and a dry $CO_2$-depleted stream 85 exits the $CO_2$ separation system 80. While $CO_2$ is being adsorbed at least one other bed 81 is undergoing regeneration using stream 90. As in the case of FIG. 2A, additional beds may be used for other steps such as cooling, pressurization, rinse, and evacuation. Part or all of stream 85 is taken as stream 95 and is used to purge the permeated moisture in the membrane dryer 71. The moisture laden stream exits the membrane dryer 71 as stream 73. An optional vacuum pump 74 may be used to increase the driving force across the membrane and to facilitate the moisture removal, and the moisture-laden stream exits the vacuum pump 74 as stream 75.

Figure 2C:
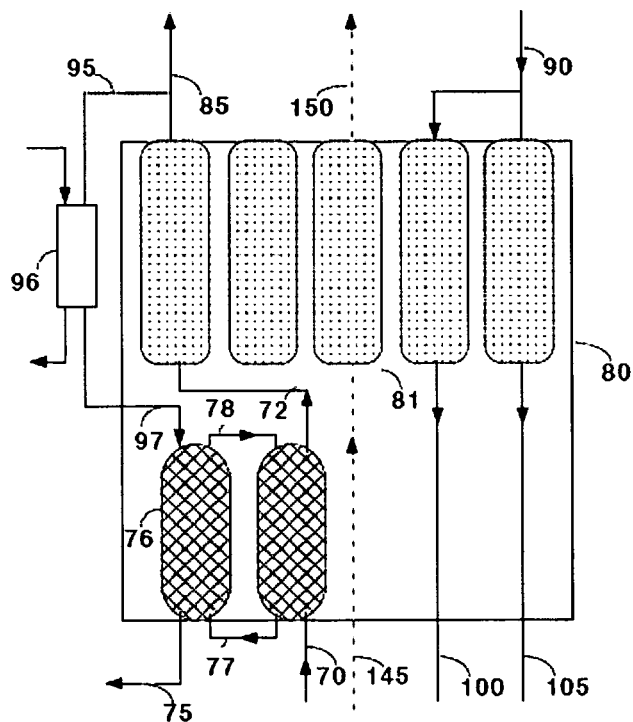

In FIG. 2C, wet $CO_2$ stream 70 is passed through an absorption system 76 wherein the moisture from the feed stream is removed by an absorbent such as ethylene glycol. The beds used for moisture removal would normally contain dumped or structured packing for mass transfer between the feed and the absorbent phases and streams would typically flow in the countercurrent direction. The dry feed stream 72 exiting the absorption system 76 is sent to $CO_2$ adsorption beds 81 wherein the $CO_2$ from feed is removed and a dry $CO_2$-depleted stream 85 exits the $CO_2$ separation system 80. While $CO_2$ is being adsorbed at least one other bed 81 is undergoing regeneration using stream 90. Additional beds may be used for other steps such as cooling, pressurization, rinse and evacuation. Part or all of $CO_2$-depleted stream, stream 85, is taken as stream 95, heated in a heat exchanger or heater 96, and passed through the absorption system 76 as stream 97 to regenerate the moisture loaded solvent stream 77. The solvent loaded with moisture can also be regenerated by countercurrent heat exchange in a heat exchanger (not shown) with steam. The regenerated solvent stream 78 is sent to the absorption system 76 for moisture removal. The stream 95 can be heated by heat exchange with steam or condensate, or the stream 95 may be heated directly using the electrical energy. The moisture loaded stream exits the absorption system 76 as stream 75.

Figure 2D:
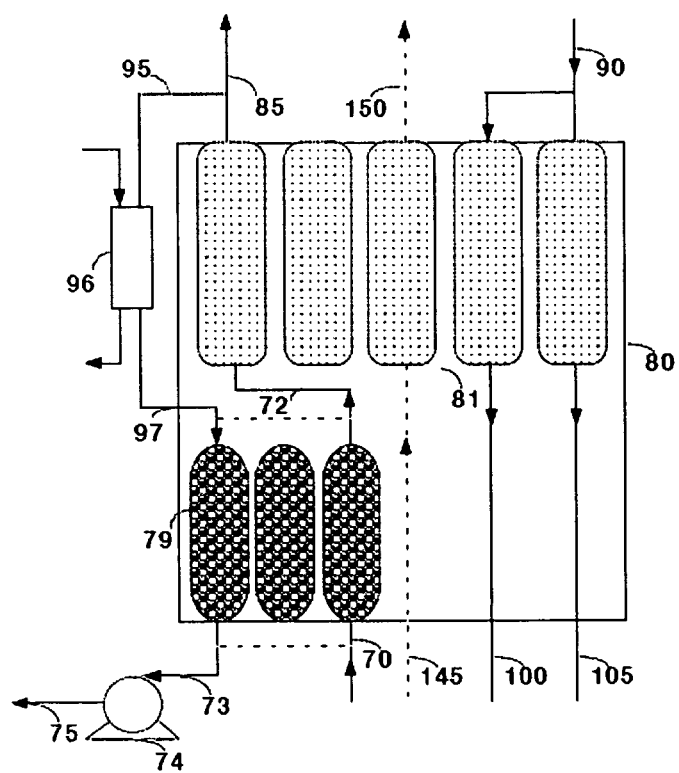

In FIG. 2D wet $CO_2$ stream 70 is passed through a moisture adsorption system 79 where the moisture from the feed stream is removed by an adsorbent such as activated alumina, silica gel or a molecular sieve. The dry feed stream 72 exiting the moisture adsorption system 79 is sent to the $CO_2$ adsorption beds 81 where the $CO_2$ from feed is removed and a dry $CO_2$-depleted stream 85 exits the $CO_2$ separation system 80. While $CO_2$ is being removed in one or more $CO_2$ adsorption beds 81, at least one other $CO_2$ adsorption bed 81 is undergoing regeneration using stream 90. Additional beds may be used for other steps such as cooling, pressurization, rinse, and evacuation. Part or all of stream 85 is taken as stream 95, optionally heated in a heat exchanger or heater 96, and is used to regenerate the moisture adsorption beds in the moisture adsorption system 79. If stream 95 is heated prior to regeneration of the moisture adsorption beds, the stream 95 can be heated by heat exchange with steam or hot water. The stream 95 can also be heated directly using electrical energy. The moisture loaded stream exits the moisture adsorption system 79 as stream 73. An optional vacuum pump 74 can be used to provide additional driving force for the moisture removal and the water loaded stream then exits the vacuum pump 74 as stream 75.

The moisture adsorption system 79 would typically contain multiple moisture adsorption beds for the removal of moisture as well as other impurities such as the heavy hydrocarbons that can hinder the adsorption of $CO_2$ in the $CO_2$ adsorption beds 81. Moisture adsorption beds in the moisture adsorption system 79 can also be designed to remove some of the sulfur oxides, nitrogen oxides and mercury impurities in the feed. For moisture removal, the moisture adsorption beds in the moisture adsorption system 79 would normally be operated in a pressure swing, temperature swing, or a vacuum swing mode. For pressure or vacuum swing adsorption, the heat of water adsorption would be retained during adsorption and stream 95 at reduced pressure would desorb the moisture. While it is possible to remove moisture by pressure swing adsorption alone, it may be necessary to use the temperature swing adsorption for desorption of other impurities such as the heavy hydrocarbons, sulfur oxides, nitrogen oxides and mercury. This can be done in a cycle comprising three or more beds and is described next.

Figure 3:
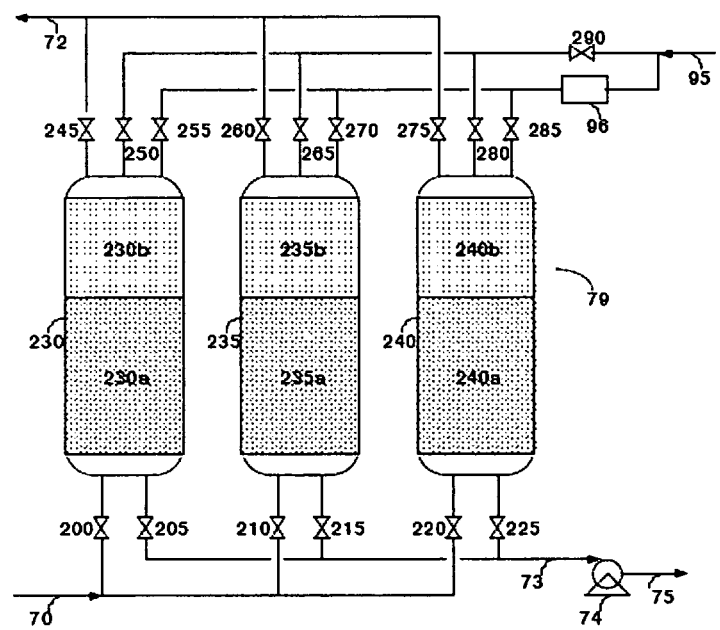
FIG. 3 exemplarily illustrates the configuration of a moisture adsorption system wherein the moisture and additional impurities, for example, hydrocarbons, sulfur oxides or nitrogen oxides, and mercury are removed by a combination of pressure and temperature swing adsorption.

FIG. 3 exemplarily illustrates the configuration of the moisture adsorption system 79 wherein the moisture and additional impurities, for example, hydrocarbons, sulfur oxides or nitrogen oxides, and mercury are removed by a combination of pressure and temperature swing adsorption. A three-bed pressure and temperature swing adsorption system for the removal of moisture and other impurities is illustrated in FIG. 3; however, the moisture and trace-impurities removal process is not limited to a three-bed system. If the removal of impurities such as sulfur oxides and hydrocarbons is not needed, two beds operating in pressure swing adsorption (PSA), vacuum swing adsorption (VSA), or temperature swing adsorption (TSA) mode can be used. Also, when the system operates in PSA and TSA or VSA and TSA mode, more than two beds can be used for PSA or VSA operation and more than one bed can be used for the TSA operation. The number of moisture adsorption beds in the moisture adsorption system 79 is not critical to the operation of this process. In the system of FIG. 3, the wet feed enters the moisture adsorption system 79 as stream 70 through valves 200, 210 and 220, respectively. These valves 200, 210 and 220 control flow of feed gas into vessels 230, 235 and 240 respectively. Vessels 230, 235 and 240 each have first adsorbent layers 230a, 235a and 240a respectively which comprise adsorbents such as activated alumina, silica gel or a molecular sieve such as 3A, 4A, 5A and 13X zeolites for moisture removal. Positioned in vessels 230, 235 and 240 above layers 230a, 235a and 240a are optional layers 230b, 235b and 240b, respectively, which comprise adsorbent(s) selective for hydrocarbons, nitrogen and sulfur oxides, and mercury. Adsorbents such as activated carbon, zeolites such as 13X, and impregnated aluminas can be used for adsorbing these impurities. Modified activated carbons and silicates can be used for the removal of mercury impurities. The adsorbents in vessels 230, 235 and 240 are chosen to minimize the adsorption of $CO_2$ so as to maximize the recovery of $CO_2$ in the $CO_2$ adsorption beds 81. The preferred adsorbents for moisture removal are 3A and 4A zeolites, activated alumina, silica gel, and mixtures of activated alumina and zeolites 3A and 4A.

The outlet ends of vessels 230, 235, and 240 are connected to discharge lines with valves 245, 260, and 275, respectively. Depending on the bed undergoing adsorption, dry $CO_2$-containing stream exits the moisture adsorption system 79 through one of these valves 245 as stream 72 and is sent to the $CO_2$ separation system 80. The purge stream 95 from the $CO_2$ separation system 80 is used to regenerate the moisture adsorption beds. For the PSA or VSA mode of regeneration, the purge gas 95 enters through valve 290 and then one of the valves 250, 265, and 280 and exits the moisture adsorption system 79 via corresponding valves 205, 215, and 225 as stream 73. If an optional vacuum pump 74 is used then the purge gas 95 exits the moisture adsorption system 79 as stream 75. For the TSA mode of regeneration, the purge gas 95 is heated in the heater or heat exchanger 96 and enters the vessels 230, 235 and 240 through one of the open valves 255, 270, and 285 and exits the moisture adsorption system 79 via corresponding valves 205, 215, and 225. If a vacuum pump 74 is not used the purge gas 95 exits the moisture adsorption system 79 as stream 73. If a vacuum pump 74 is used the purge gas 95 exits the moisture adsorption system 79 as stream 75. In normal operation, regeneration of one of the vessels by PSA or VSA and another vessel by TSA is contemplated.

The various layers are preferably contained in single vessels, as shown in the drawing, although each layer may be contained in separate vessels, if desired. The duration of each complete cycle of the PSA stage is, at most, several minutes (mins) typically 4-60 minutes, while the duration of the thermal regeneration is generally about 1-12 hours; accordingly, during any single phase of the process, the two vessels in the PSA or VSA mode will undergo many PSA or VSA cycles while the third vessel undergoes a single thermal regeneration step. For purposes of illustration, it will be assumed that the PSA or VSA process is carried out with pressurization to super atmospheric pressure during the adsorption step and reduction of pressure to atmospheric pressure or below during the bed regeneration step. The pressure in the vessel undergoing thermal regeneration is at or near atmospheric pressure.

The process described below comprises three phases; a first phase, in which vessels 230 and 235 are initially operating in an alternating PSA or VSA cycle and the adsorbent in vessel 240 is undergoing thermal regeneration; a second phase, in which vessels 235 and 240 are operating in an alternating PSA or VSA cycle while the adsorbent in vessel 230 undergoes thermal regeneration; and a third phase, in which vessels 230 and 240 are operating in an alternating PSA or VSA cycle, while the adsorbent in vessel 235 undergoes thermal regeneration.

At the start of stage 1 of the first phase of the process, one of the vessels 230 or 235, for example vessel 230 is in the adsorption mode and the other vessel is in the regeneration mode. With vessel 230 starting in the adsorption mode, wet feed 70 enters the bed through open valve 200 and exits the bed through open valve 245. Prior to start of adsorption, vessel 230 is pressurized to the adsorption pressure through valve 200. As the feed 70 passes through vessel 230 substantially all of water vapor, hydrocarbons, sulfur oxides, and mercury and some of the nitrogen oxides are removed. The dew point of the gas stream exiting the moisture adsorption system 79 would normally be below $-40°$ C. and more preferably below $-60°$ C. For regeneration of bed 235, part of the purge gas 95 enters through open valves 290 and 265 and picks up moisture from the adsorbent bed 235 and exits through valve 215. Although not necessary, the purge gas may be heated prior to its use in the PSA or VSA process. The remainder of the purge gas entering the moisture adsorption system 79 is heated in heater or heat exchanger 96 and then flows through the layers 240*a* and 240*b* in vessel 240. As the heated purge gas passes through the layers 240*a* and 240*b* in vessel 240, the purge gas desorbs the residual moisture, hydrocarbons, nitrogen and sulfur oxides, and mercury from different layers that have gradually built up in this vessel 240 over the previous PSA or VSA stages carried out in this vessel. The regeneration gas, together with the desorbed impurities leaves vessel 240 through open valve 225. After a certain time based on the moisture concentration in stream 72 and the retention of the heat front in the bed, typically 4 to 60 minutes, vessel 230 starts undergoing regeneration while vessel 235 starts removing moisture and other impurities. Vessels 230 and 235 continue under PSA or VSA operation for a period of several hours or days, typically 8 to 96 hours, while vessel 240 is thermally regenerated during part of this time. The temperatures for thermal regeneration typically range between 100° C. and 300° C. but can be higher or lower depending on the material. The impurities such as nitrogen and sulfur oxides removed during the thermal regeneration may be sent to the existing nitrogen and sulfur removal systems for further reduction of these impurities.

As the PSA or VSA cycle proceeds in vessels 230 and 235, various impurities such as sulfur oxides and mercury which are more strongly adsorbed that water vapor accumulate in these vessels as they are not removed during the purge step of the pressure swing or the vacuum swing adsorption. When the buildup of these components in one or more layers reaches the point where it threatens to adversely affect the efficiency of the gas purification process, the first phase of the process is terminated and the second phase is started.

During the second phase of the process vessels 235 and 240 are in alternating PSA or VSA service and the adsorbents in vessel 230 undergo thermal regeneration. At the start of stage 1 of this phase of the process, one of the vessels 235 or 240, for example vessel 235 is in the adsorption mode and the other vessel is in the regeneration mode. With vessel 235 starting in the adsorption mode, wet feed 70 enters the bed through open valve 210 and exits the bed through open valve 260 and is purified in the process. Prior to start of adsorption, vessel 235 is pressurized to the adsorption pressure through valve 210. For regeneration of bed 240, part of the purge gas 95 enters through open valves 290, and 280, picks up moisture from the adsorbent bed 240 and exits through open valve 225. The remainder of the purge gas entering the moisture adsorption system 79 is heated in a heater or heat exchanger 96 and then flows through the layers 230*a* and 230*b* in vessel 230 and desorbs the residual moisture, hydrocarbons, nitrogen and sulfur oxides and mercury from different layers that have gradually built up in this vessel 230 over the previous PSA or VSA stages carried out in this vessel 230. The regeneration gas, together with the desorbed impurities leaves vessel 230 through open valve 205. After a certain time based on moisture concentration in stream 72 and retention of the heat front in the vessel, vessel 235 starts undergoing regeneration while vessel 240 starts removing moisture and other impurities. Vessels 235 and 240 continue under alternating PSA or VSA operation for a period of several hours or days while vessel 230 is thermally regenerated during part of this time.

As the PSA or VSA cycle proceeds in vessels 235 and 240, various impurities which are more strongly adsorbed than water vapor buildup in vessels 235, and 240. When the buildup of these components in one or more layers reaches the point where it threatens to adversely affect the efficiency of the gas purification process, the second phase of the process is terminated and the third phase is started.

During the third phase of the process vessels 230 and 240 are in PSA or VSA service and the adsorbent in vessel 235 undergoes thermal regeneration. Operation of the third phase is similar to the operation of the first and the second phases. After all the three phases are completed the process starts again with phase one and all three phases are repeated in a cyclic manner.

Like the PSA or VSA beds, the $CO_2$ adsorption or reaction beds (beds A to E in FIG. 4) also undergo a cyclic process to provide continuous operation and also to maximize $CO_2$ recovery. These beds contain one or more materials that have a significant selectivity for $CO_2$ over other major components of the flue gas, namely oxygen, nitrogen and argon. Some of the materials that can be used to capture $CO_2$ from the flue gas comprise, for example, activated carbon, carbon molecular sieves, zeolites such as 4A, 5A, 13X, NaY and CaX, metallorganic framework compounds, natural zeolites, modified natural and synthetic zeolites, modified activated carbon, pillared clays and reactive sorbents such as sodium and potassium carbonates, amines or ionic liquids supported on a microporous support.

Figure 4:
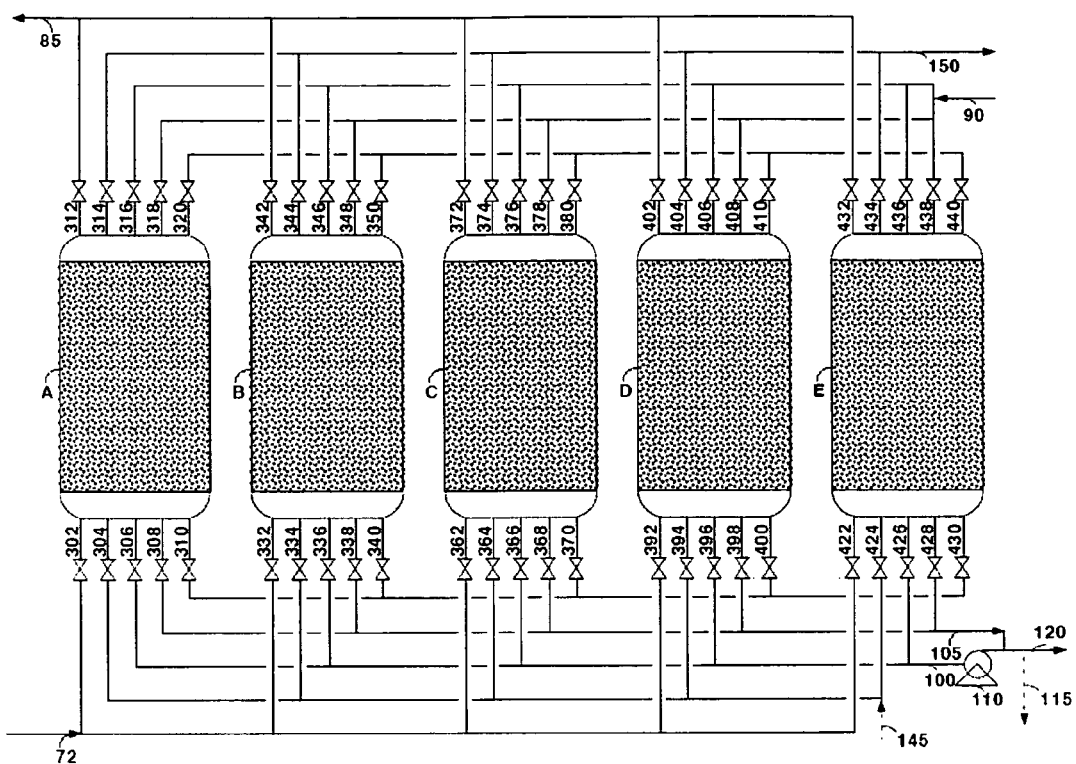
FIG. 4 exemplarily illustrates the configuration of the $CO_2$ separation system wherein $CO_2$ is removed from the feed stream by adsorption or chemical reaction and is recovered by heating directly or indirectly by steam, hot water or a dry stream recovered from the $CO_2$ separation system.

Various beds in the $CO_2$ capture section illustrated in FIG. 4 would typically undergo the steps of adsorption, equalization, rinse with $CO_2$ product, heating, heating with evacuation, cooling and re-pressurization. Depending on the material and the process conditions different combinations of the steps can be used to maximize the $CO_2$ recovery. Also in some of the cycles some of the steps such as bed cooling can be eliminated. During the operation of the $CO_2$ adsorption beds 81, any sulfur oxide impurities in the feed to the $CO_2$ capture section are likely to be removed as most adsorbents have a higher affinity for sulfur oxides than $CO_2$. Since most adsorbents have a higher affinity for $CO_2$ over nitrogen oxides, most of the nitrogen oxide impurities in the feed to this section would pass through into the $CO_2$-depleted stream 85 leaving the $CO_2$ separation system 80. For $CO_2$ removal by the chemical reaction, such as with supported carbonates or amines, some of the nitrogen and sulfur oxides may also be removed by chemical reaction.

FIG. 4 exemplarily illustrates the configuration of the $CO_2$ separation system 80 wherein $CO_2$ is removed from the feed stream by adsorption or chemical reaction and is recovered by heating directly or indirectly by steam, hot water or a dry stream recovered from the $CO_2$ separation system 80. A five-bed $CO_2$ capture process is illustrated schematically in FIG. 4. The $CO_2$ feed step and the $CO_2$ production steps are continuous in this cycle. While the $CO_2$ capture is illustrated using a five-bed process the $CO_2$ capture process is not limited to five beds. The process can use less than five beds or more than five beds though a minimum of two beds are required to carry out $CO_2$ capture and production at the same time. As illustrated in FIG. 4 at any given time, one bed is removing $CO_2$ from feed using adsorption or reaction, another bed is undergoing equalization and pressurization steps, a third bed is producing $CO_2$ while being heated, a fourth bed is producing $CO_2$ during heating and evacuation steps and the fifth bed is undergoing the steps of $CO_2$ rinse and equalization. Other cycles similar to this can be used omitting the steps such as the $CO_2$ rinse and adding steps such as bed cooling after the heating steps. The equalization can be done from the bottom, from the top or from both top and the bottom. Pressurization can also be done from the bottom using the feed or from the top using the $CO_2$-depleted stream.

Each individual step of the $CO_2$ capture process is likely to be of the order of 2-60 minutes to maximize the productivity of the process. A typical cycle using the five-bed configuration of FIG. 4 is given in Table I.

The feed to adsorbers A to E is typically at a temperature between about 10 and 80° C. and at pressures between about 1.07 bara and 40 bara, and at a temperature in the range of about 20° C. and 60° C. For the $CO_2$ capture from the flue gas of a power plant or a refinery, the pressures will be in the range of about 1.07 and 1.34 bara. The regeneration temperatures are in the range of about 80° C. and 300° C. and more typically in the range of about 80° C.-150° C. The concentration of $CO_2$ in the feed gas is about 3% for a natural gas fired power plant, about 12% for a coal-fired power plant and up to 60% of $CO_2$ for various chemical processes. Prior to the initial start of $CO_2$ separation, the beds in adsorbers A to E may be heated to temperatures higher than 300° C. to remove any residual moisture contained therein. High temperature regeneration may also be performed to remove impurities built up during normal operation.

The operation of various valves is illustrated using steps 1 and 2 of Table I. In both steps 1 and 2 for bed A, feed gas 72 enters the bed through open valve 302, $CO_2$ is captured in the bed and the $CO_2$-depleted stream exits the bed as stream 85 through the open valve 312. During step 1, beds B and E undergo pressure equalization through open valves 340 and 430. During step 2, bed B is pressurized using bed A through open valves 320 and 350. During both steps 1 and 2, bed C is regenerated by heating under vacuum and valves 366 is open. The high purity $CO_2$ product leaves as stream 100 prior to entering the vacuum pump 110. During both steps 1 and 2, bed D is regenerated by heating, valves 398 and 408 are open and product $CO_2$ leaves as stream 105. During step 2, bed E is rinsed with product $CO_2$ stream 145 which enters the bed through open valve 424 and exits through open valve 434. Operation of various valves during steps 3 to 10 is similar to operation during steps 1 and 2. Once all the steps are completed, the cycle is repeated continuously starting at step 1.

moisture tolerant, fast heating can be accomplished by directly heating the beds with steam though this will have to be followed by a purge to remove steam, and then the beds will have to be cooled. For adsorbents or reactants that are not moisture-tolerant such as zeolites, direct heating with steam is not an option and heating with a dry gas will be too slow. For these cases, the beds may have to be heated indirectly. One such configuration is the shell and tube configuration wherein the adsorbents or reactants are contained in small diameter tubes and the heating medium flows on the shell side during the regeneration part of the cycle. Regeneration temperatures of about 80° C.-300° C. can be obtained using steam or hot water as the heating medium. A heated liquid or vapor stream utilizing the electricity generated in the power plant can also be used for regeneration. An alternative configuration includes the adsorbent material on the shell side and the heating or the cooling fluid on the tube side. Another configuration that allows indirect heating is a plate and frame configuration wherein adsorbents are contained in alternate parallel passages and the heated fluid flows in alternate parallel passages. Steam or a heated fluid may be used as the heating medium. For the shell and tube configuration and the plate and frame configurations, cold fluid can be used during the $CO_2$ removal step to remove the heat of adsorption or chemical reaction. Cold fluid can also be used for the bed cooling steps. For retrofit applications it might be easier to use the hot water or low pressure steam as the regeneration medium as this minimizes the disruption to the steam cycle of the power plant and would be easy to retrofit. In addition to the vertical beds both the horizontal and the radial beds can be used for carrying out the cycle. Also, if needed, either the shell and tube configuration or the plate and frame configuration can be used for heat exchange with horizontal or the radial beds.

The $CO_2$ generated during the heating and the evacuation parts of the cycle would typically have a purity of higher than 90%. This stream is compressed and sent to a $CO_2$ purifica-

TABLE I

Typical Cycle Sequence for the $CO_2$ Capture Process

| Step | Bed A | Bed B | Bed C | Bed D | Bed E | Time, mins |
|---|---|---|---|---|---|---|
| 1 | Adsorption/reaction | Equalization with Bed E | Heating with evacuation | Heating | Equalization with Bed B | 2.0 |
| 2 | Adsorption/reaction | Pressurization | Heating with evacuation | Heating | $CO_2$ rinse | 2.0 |
| 3 | Equalization with Bed C | Adsorption/reaction | Equalization with Bed A | Heating with evacuation | Heating | 2.0 |
| 4 | $CO_2$ rinse | Adsorption/reaction | Pressurization | Heating with evacuation | Heating | 2.0 |
| 5 | Heating | Equalization with Bed D | Adsorption/reaction | Equalization with Bed B | Heating with evacuation | 2.0 |
| 6 | Heating | $CO_2$ rinse | Adsorption/reaction | Pressurization | Heating with evacuation | 2.0 |
| 7 | Heating with evacuation | Heating | Equalization with Bed E | Adsorption/reaction | Equalization with Bed C | 2.0 |
| 8 | Heating with evacuation | Heating | $CO_2$ rinse | Adsorption/reaction | Pressurization | 2.0 |
| 9 | Equalization with Bed D | Heating with evacuation | Heating | Equalization with Bed A | Adsorption/reaction | 2.0 |
| 10 | Pressurization | Heating with evacuation | Heating | $CO_2$ rinse | Adsorption/reaction | 2.0 |
| | | | | | Total | 20.0 minutes |

As shown in Table I, various steps in the $CO_2$ capture and regeneration process are significantly faster than in a typical temperature swing adsorption process where these steps are of the order of hours. For adsorbents and reactants that are tion plant as discussed earlier. If a membrane is used for $CO_2$ purification, a small portion of the $CO_2$ stream is allowed to permeate the membrane to produce a higher purity $CO_2$ stream which is used as the rinse stream in the $CO_2$ separation system 80. The rest of the stream may be further compressed and used for enhanced oil recovery, industrial applications or for $CO_2$ sequestration. If a getter process is used for $CO_2$ purification impurities such as oxygen and sulfur dioxide are removed by reaction with the getter and the purified $CO_2$ stream may be further compressed and used in various applications. If a distillation process is used for $CO_2$ purification, $CO_2$ is produced as the bottoms product and the non-condensibles are removed as the overheads of the distillation column. Part of the $CO_2$ produced by distillation may be used to provide the purge in the $CO_2$ capture section; the rest is pumped to a higher pressure and used for various applications such as enhanced oil recovery or sequestration. The non-condensibles stream may be further purified by a membrane or an adsorption process to recover additional amounts of $CO_2$.

Example 1

Commercially available 5A zeolite of 8×12 mesh size (about 1.5 mm) was obtained from Aldrich Corporation and loaded in two 18 mm diameter adsorbent beds. The total weight of adsorbent was about 500 grams (gms). A feed stream containing about 12.5% $CO_2$ with the balance being nitrogen, to simulate flue gas from a coal-fired power plant, was passed through these beds at a flow rate of 11 standard liters/min and at a pressure of 1.34 bara. The standard conditions refer to 21.1° C. and 1 bara. The adsorbing bed was cooled with a jacket containing a water/glycol mixture at 30° C. The regenerating bed was heated with a jacket containing water/glycol mixture at 100° C. The concentrations in the $CO_2$-depleted stream and in the $CO_2$ product were analyzed using an infrared $CO_2$ analyzer. The cycle for this process is shown in Table II. After heating, the beds were evacuated to a pressure of about 0.25 bara during the evacuation steps. For these process conditions, an average $CO_2$ purity of 99.8% and an average $CO_2$ recovery of 85.8% were obtained.

TABLE II

Two Bed $CO_2$ Capture Process Cycle

| Step # | Bed A | Bed B | Step Time Mins |
|---|---|---|---|
| 1 | Adsorption | Heating with evacuation | 8.0 |
| 2 | Equalization | Equalization | 1.0 |
| 3 | Rinse | Idle | 1.0 |
| 4 | Heating | Idle | 7.0 |
| 5 | Heating | Pressurization | 1.0 |
| 6 | Heating with evacuation | Adsorption | 8.0 |
| 7 | Equalization | Equalization | 1.0 |
| 8 | Idle | Rinse | 1.0 |
| 9 | Idle | Heating | 7.0 |
| 10 | Pressurization | Heating | 1.0 |

Example 2

The process of Example 1 was run at different adsorption temperatures. Other process conditions, namely the feed pressure, feed $CO_2$ concentration, and the adsorbent material were the same as in Example 1. Again, the concentrations in the $CO_2$-depleted stream and in the $CO_2$ product stream were analyzed using an infrared $CO_2$ analyzer. The process cycle of Table II was used. For a feed temperature of 20° C., an average $CO_2$ purity of 99.0% and an average $CO_2$ recovery of 88% were obtained. For a feed temperature of 40° C., an average $CO_2$ purity of 99.2% and an average $CO_2$ recovery of 84% were obtained.

Example 3

The process of Example 1 was run with a commercially available 13X zeolite of 8×12 mesh size (1.5 mm) obtained from the Aldrich Corporation. The feed pressure, and the feed $CO_2$ concentration were the same as in Example 1 and the process cycle of Table II was used. Again, the concentrations in the $CO_2$-depleted stream and in the $CO_2$ product stream were analyzed using an infrared $CO_2$ analyzer. For a feed temperature of 20° C., an average $CO_2$ purity of 98.5% and an average $CO_2$ recovery of 87% were obtained. For a feed temperature of 30° C., an average $CO_2$ purity of 98.5% and an average $CO_2$ recovery of 78% were obtained.

Example 4

The beds containing 5A as in Example 1 were used (total weight of about 500 gms) with a feed stream containing about 3.4% $CO_2$ with the balance being nitrogen, to simulate the flue gas from a natural gas fired power plant. The feed was passed through these beds at a total flow rate of 17 standard liters/min. The adsorbing bed was cooled with a jacket containing a water/glycol mixture at 20° C. The process cycle in Table II was used. The regenerating bed was heated with a jacket containing water/glycol mixture at 100° C. The concentrations in the $CO_2$-depleted stream and in the $CO_2$ product were analyzed using an infrared $CO_2$ analyzer. For these process conditions, an average $CO_2$ purity of 91% and an average $CO_2$ recovery of 86% were obtained. The results of this example indicate that the process of this invention can provide reasonable purities and recoveries for streams containing very low levels of carbon dioxide such as that from a natural gas fired power plant.

Comparative Example 1

The 5A zeolite of Example 1 was used to obtain the results for a vacuum swing adsorption process without any thermal regeneration. The feed comprised 12.8% $CO_2$ at 1.34 bara and 30° C. The beds were evacuated to a pressure of 0.25 bara during the regeneration step. Both the adsorption and the regeneration steps were carried out at 30° C. The process cycle comprised adsorption, equalization, rinse with pure $CO_2$, evacuation, equalization and pressurization steps.

For a feed flow of 5.5 standard liters per min and an adsorption time of 4 minutes, an equalization time of 0.5 minutes, a rinse time of 1.0 minutes, an evacuation time of 4.0 minutes, and a pressurization time of 0.5 minutes, an average $CO_2$ purity of 81.6% and an average $CO_2$ recovery of 25.4% were obtained. The reduction of feed flow to 2.2 standard liters per minutes decreased the average purity to 53% and the average recovery to 26%. For a feed flow of 5.5 standard liters per minute and a faster cycle (2 minute adsorption, 0.25 minute equalization, 0.5 minute rinse, 2 minute evacuation and 0.25 minute pressurization) an average purity of 59.4% and an average recovery of 43.9% were obtained.

Comparison of the results of this example with Example 1 indicates that the performance both in terms of $CO_2$ recovery and $CO_2$ purity is significantly worse without thermal regeneration of the beds.

Example 5

Commercially available F-200 activated alumina from Alcoa (1.5 mm size) was loaded in the beds of Example 1. The total weight of the adsorbent was about 300 gms. A feed stream saturated with water at 25° C. and containing about 12.5% $CO_2$ with the balance being nitrogen was passed through these beds at a total flow rate of 10 standard liters/min and at a pressure of 1.34 bara. The cycle comprised an adsorption time of 5 minutes, a purge time of 4.5 minutes, and a pressurization and depressurization time of 0.25 minutes each and was designed to retain most of the heat of water adsorption in the beds. The dry product exiting the adsorbing bed was used for purge after reducing the pressure to about atmospheric. The dew point of the product stream exiting the beds was monitored continuously and the product moisture concentration remained below 1 parts per million (ppm) during a period of five days.

This example illustrates that under certain conditions the feed stream to the $CO_2$ separation can be dried to very low moisture levels to improve the $CO_2$ recovery in the $CO_2$ separation section. The purge gas in a process wherein the moisture is removed prior to $CO_2$ adsorption would be the $CO_2$-depleted stream from the $CO_2$ adsorption section.

The results of these Examples suggest that the process disclosed herein can be used for recovering $CO_2$ from various process streams at high purity and recovery. Estimates of the energy consumption for this process indicate that the energy required to capture $CO_2$ for this process is about half the energy required for the amine-based $CO_2$ capture process.

The method and system disclosed herein for the capture of $CO_2$ offers a number of advantages. The process can be used both for retrofit applications as well as for the new plants. Modifications required to the power plant for retrofit applications are significantly smaller than those needed for amine-based $CO_2$ capture. The process is applicable to both coal-fired and natural-gas fired power plants. The process is also applicable to other streams such as the refinery and chemical process streams containing carbon dioxide. Unlike absorption processes where nitrogen and sulfur oxides ($NO_X$ and $SO_X$) in the feed can react with the solvent irreversibly and require removal to below about 10 ppm levels, the $NO_X$ and $SO_X$ in the feed do not affect the adsorbent adversely. Oxygen in the feed has no effect on the adsorbents unlike absorption-based processes where oxygen degrades the amine solvent. The process provides dry $CO_2$ product eliminating the drying step prior to $CO_2$ compression and liquefaction, and the power and capital costs associated with it.

Although the system and methods herein are described with reference to specific examples, the scope of the invention is not limited thereto. For example, the feed gas containing $CO_2$ can come from other processes such as a natural gas fired power plant or from a coal gasification plant.

The foregoing examples have been provided merely for the purpose of explanation and are in no way to be construed as limiting of the present method and system disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A method for separating carbon dioxide from a gas stream containing water vapor and additional impurities comprising performing the following steps one or more times:
    subjecting said gas stream to a first moisture removal step, wherein substantially all of the moisture from gas in the gas stream is removed using a process selected from a group comprising pressure swing adsorption, temperature swing adsorption, membrane separation, and absorption;
    subjecting the substantially water vapor-free gas from said first moisture removal step to a second temperature swing adsorption step, wherein said second temperature swing adsorption step is conducted in a bed comprising an adsorbent, wherein the second temperature swing adsorption step comprises an adsorption step for producing a substantially dry carbon dioxide-depleted stream, and an adsorbent regeneration step comprising heating said adsorbent bed to produce a substantially water vapor-free carbon dioxide stream; and
    regenerating one of the adsorbents and absorbents in said first moisture removal step using said substantially dry carbon dioxide-depleted stream from the second temperature swing adsorption step.

2. The method of claim 1, wherein pressure of the gas stream is in a range of about 1.07 to about 40 bar absolute, the carbon dioxide concentration is in a range of about 3% to 60% by volume, and gas temperature is in a range of about 10 degree C. to 80 degree C.

3. The method of claim 1, wherein duration of said pressure swing adsorption process in said first moisture removal step is in a range of about 4 minutes to about 60 minutes and duration of said temperature swing adsorption process during the first moisture removal step is in a range of about 1 hour to 12.0 hours.

4. The method of claim 1, wherein temperature in the second temperature swing adsorption step during said adsorbent regeneration step is increased to about 80 degree C. to 300 degree C.

5. The method of claim 1, wherein duration of the second temperature swing adsorption step is in a range of about 2 minutes to 60 minutes.

6. The method of claim 1, wherein said gas is a flue gas from one of a coal-fired power plant, a natural gas fired power plant, and a refinery.

7. The method of claim 1, wherein adsorbent used in said first moisture removal step is selected from a group comprising activated alumina, silica gel, and a molecular sieve comprising 3A, 4A, 5A and 13X zeolites.

8. The method of claim 1, wherein moisture content in said first moisture removal step is reduced to a dew point of −40.degree C. or below.

9. The method of claim 1, wherein said adsorbent used in the second temperature swing adsorption step is selected from activated carbon, carbon molecular sieves, 4A, 5A, 13X, NaY and CaX zeolites, metallorganic framework compounds, natural zeolites, modified natural and synthetic zeolites, modified activated carbon, and pillared clays.

10. The method of claim 1, wherein purity of said substantially water vapor-free carbon dioxide stream produced in the second temperature swing adsorption step is 90% or higher.

11. The method of claim 1, wherein the substantially dry carbon dioxide-depleted stream from the second temperature swing adsorption step is used for providing a driving force for a membrane drying step.

12. The method of claim 1, wherein said adsorbent regeneration step comprises heating the adsorbent bed directly with a gas stream or indirectly using steam or a hot fluid in a heat exchanger configuration.

13. The method of claim 12, further comprising bed evacuation after bed heating to recover additional amounts of carbon dioxide.

14. The method of claim 1, wherein the second temperature swing adsorption step further comprises the steps of bed equalization, bed pressurization, bed depressurization, and bed cooling.

15. The method of claim 1, wherein impurities in the feed to the second temperature swing adsorption step comprise hydrocarbons, oxygen, nitrogen, argon, and nitrogen oxides.

16. The method of claim 1, wherein said additional impurities selected from the group comprising hydrocarbons, nitrogen oxides, sulfur oxides, and mercury are removed from the gas stream in said first moisture removal step.

17. The method of claim 1, wherein adsorbents used for removal of hydrocarbons, nitrogen oxides, sulfur oxides, and mercury are selected from activated carbon, 13X zeolites, impregnated aluminas, modified activated carbons, and silicates.

18. The method of claim 1, wherein said moisture and additional impurities removal process comprises a system comprising a first adsorption section, a second adsorption section, and a third adsorption section arranged in parallel, each of said first adsorption section, said second adsorption section, and said third adsorption section comprising a first zone containing a moisture removal adsorbent and a second zone containing one or more adsorbents for the removal of impurities selected from hydrocarbons, nitrogen oxides, sulfur oxides, and mercury, comprising performing the following steps one or more times:

subjecting said gas to a cyclic pressure swing adsorption process comprising alternating adsorption steps and adsorbent regeneration steps in the first adsorption section and the second adsorption section, thereby removing substantially all of the water vapor from the gas, while desorbing water vapor and other impurities from said adsorbents in said first zone and said second zone of said third adsorption section by heating the adsorbents;

subjecting said gas to a cyclic pressure swing adsorption process comprising alternating adsorption steps and adsorbent regeneration steps in the first adsorption section and the third adsorption section, thereby removing substantially all of the water vapor from the gas, while desorbing water vapor and other impurities from the adsorbents in the first zone and the second zone of the second adsorption section by heating the adsorbents; and subjecting said gas to a cyclic pressure swing adsorption process comprising alternating adsorption steps and adsorbent regeneration steps in the second adsorption section and the third adsorption section, thereby removing substantially all of the water vapor from said gas, while desorbing water vapor and other impurities from the adsorbents in the first zone and the second zone of the first adsorption section by heating the adsorbents.

19. The method of claim 18, wherein the adsorbent heating step is carried out at a temperature in a range of about 80.degree. C.-300.degree. C.

20. A method of separating and purifying carbon dioxide from a gas stream containing water vapor and additional impurities, comprising:

performing a step of directly sending said gas stream to a temperature swing adsorption step, wherein the temperature swing adsorption step comprises an adsorption step to produce a carbon dioxide-depleted stream, and an adsorbent regeneration step comprising heating the adsorbent bed to produce a substantially pure carbon dioxide stream; and purifying said carbon dioxide by one of a membrane process, a distillation process, an adsorption process, and a getter process to remove impurities comprising nitrogen, oxygen, argon, nitrogen oxides, sulfur oxides, and moisture.

21. The method of claim 20, wherein the adsorbent for the temperature swing adsorption step is selected from activated carbon, a carbonate, an amine, or an ionic liquid on a microporous support.

22. The method of claim 1, wherein the carbon dioxide stream is further purified by one of a membrane process, a distillation process, an adsorption process, and a getter process to remove impurities comprising nitrogen, oxygen, argon, nitrogen oxides, sulfur oxides, and moisture.

23. The method of claim 22, wherein said purified carbon dioxide is used for providing high purity rinse in the carbon dioxide adsorption system.

24. The method of claim 20, wherein said purified carbon dioxide provides high purity rinse in a carbon dioxide adsorption system.

* * * * *